United States Patent
Jaradi et al.

(10) Patent No.: US 11,208,070 B1
(45) Date of Patent: Dec. 28, 2021

(54) AIRBAG SYSTEM AND METHOD(S) OF USE THEREOF

(71) Applicant: Ford Global Technologies, LLC, Dearborn, MI (US)

(72) Inventors: Dean M. Jaradi, Macomb, MI (US); Mohammad Omar Faruque, Ann Arbor, MI (US); S. M. Iskander Farooq, Novi, MI (US); Joseph Edward Abramczyk, Farmington Hills, MI (US); Zhibing Deng, Northville, MI (US); Deepak Patel, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/071,429

(22) Filed: Oct. 15, 2020

(51) Int. Cl.
| | |
|---|---|
| *B60R 21/2338* | (2011.01) |
| *B60R 21/207* | (2006.01) |
| *B60R 21/233* | (2006.01) |
| *B60R 21/015* | (2006.01) |
| *B60R 21/013* | (2006.01) |
| *B60R 21/01* | (2006.01) |

(52) U.S. Cl.
CPC ........ *B60R 21/2338* (2013.01); *B60R 21/013* (2013.01); *B60R 21/01554* (2014.10); *B60R 21/207* (2013.01); *B60R 21/233* (2013.01); *B60R 2021/01211* (2013.01); *B60R 2021/23324* (2013.01); *B60R 2021/23386* (2013.01); *B60R 2021/23388* (2013.01)

(58) Field of Classification Search
CPC . B60R 21/2338; B60R 21/233; B60R 21/013; B60R 21/01554; B60R 21/207; B60R 2021/23388; B60R 2021/23386; B60R 2021/01211; B60R 2021/23324
See application file for complete search history.

(56) References Cited

U.S. PATENT DOCUMENTS

| | | | |
|---|---|---|---|
| 7,905,513 B2 | 3/2011 | Honda | |
| 8,616,579 B2 | 12/2013 | Suzuki et al. | |
| 8,777,257 B2 | 7/2014 | Fukawatase et al. | |
| 9,333,931 B1* | 5/2016 | Cheng | B60R 21/08 |
| 11,110,881 B1* | 9/2021 | Deng | B60R 21/207 |
| 2006/0119083 A1* | 6/2006 | Peng | B60R 21/207 |
| | | | 280/730.2 |
| 2019/0248322 A1* | 8/2019 | Herzenstiel | B60R 21/207 |
| 2020/0094772 A1* | 3/2020 | Markusic | B60N 2/42727 |

FOREIGN PATENT DOCUMENTS

JP    5286765 B2    6/2013

\* cited by examiner

*Primary Examiner* — Drew J Brown
(74) *Attorney, Agent, or Firm* — Frank A. MacKenzie; Bejin Bieneman PLC

(57) ABSTRACT

The present disclosure relates to an airbag system which is operable to deploy in a vehicle crash event. The airbag system includes an airbag having an upper chamber, a lower chamber, an actuator, a tether, and an actuatable pin. In one example, the tether has a predetermined length and extends between the actuator and the lower chamber. The actuator is disposed at a predetermined lateral distance from the lateral chamber and is configured to inflate the upper chamber and the lower chamber to a predefined pressure. Furthermore, the actuatable pin is configured to maintain the tether in an indirect path when the airbag is not deployed and the actuatable pin is configured to allow the tether to have a direct path between the actuator and the lower chamber when the airbag is deployed.

20 Claims, 7 Drawing Sheets

AIRBAG SYSTEM AND METHOD(S) OF USE THEREOF

TECHNICAL FIELD

The present disclosure relates to an airbag system and related method(s) to deploy the airbag system in a vehicle crash event.

BACKGROUND

Vehicles provide a variety of passive restraint systems to protect an occupant from injury during a vehicle crash event. Exemplary passive restraint systems may include airbags disposed at multiple locations within the vehicle. The airbag includes an inflatable bag that is deployed during the vehicle crash event to provide cushioning to the occupant who hits against the inflated airbag.

To protect the occupant during a side crash event, the vehicles include one or more side airbags. The side airbags are generally installed in a side of a vehicle seat and are deployed from the side of the seat to protect the occupant in the seat. Although the side airbags provide adequate protection to the occupant's upper body region (i.e. torso), the side airbags provide little or no protection to a lower body region of the occupant, such as lower extremities of the occupants including the thighs and upper legs of the occupant.

SUMMARY

The present disclosure relates to aspects of an airbag system that can provide adequate protection to an occupant's upper and lower body region during a vehicle crash event.

One embodiment of the present disclosure relates to the airbag system having two chamber airbag arrangement including a tether coupled with a lower chamber operable to position the lower chamber during a crash event. The airbag may deploy and inflate to a predetermined pressure during a vehicle crash event. The airbag system can have a two chamber airbag (e.g. an upper chamber and a lower chamber), and include an actuator, a tether, and an actuatable pin. In one example, the tether has a predetermined length extending between the actuator and the lower chamber. The tether, while being coupled to the lower chamber and the actuator, may assume a direct path and/or an indirect path. Specifically, the actuatable pin disposed along the length of the tether maintains the tether in the indirect path when the airbag is in an undeployed state. The undeployed state is where the two chambers remain collapsed and no vehicle crash event is detected. During the vehicle crash event, the actuator operably generates a predetermined tension in the tether that actuates the pin and allows the tether to assume the direct path between the actuator and the lower chamber, thereby positioning the lower chamber.

In one example, the upper chamber and the lower chamber are in fluidic communication with each other. During the vehicle crash event, the lower chamber may inflate prior to the upper chamber. The airbag system may include and/or operably communicate with an impact sensor to operably deploy the airbag. In addition, the airbag system may include a seat position sensor that prevents the actuation of the pin if a seat is positioned in one or more predetermined positions. In one example, the actuator is a spool actuator that generates the predetermined tension on the tether and receives a portion of the tether during the vehicle crash event. The tether has a pretension less than the predetermined tension. In one example, the actuatable pin may include a breakable pin, while in another example, the actuatable pin is a retractable pin that is operable to transition from an extended position to a retracted position during the vehicle crash event.

Another embodiment of the present disclosure relates to a vehicle safety system that includes a seat and an airbag. In one example, the seat includes a seat back that has a substantially vertical orientation and a seat cushion that has a substantially horizontal orientation. Further, the airbag may inflate to a predetermined pressure when deployed during a vehicle crash event. The airbag may be disposed within at least a portion of the seat back of the seat. The airbag includes an upper chamber that may deploy adjacent to an occupant shoulder region and a lower chamber that deploys adjacent to an occupant hip region. The airbag further includes an actuator disposed at a lateral distance from the lower chamber. A tether having a predetermined length extends between the lower chamber and the actuator. An actuatable pin is disposed along the predetermined length of the tether and maintains the tether in an indirect path between the actuator and the lower chamber. In one example, when the airbag is deployed, the actuator creates a predetermined tension on the tether and the actuatable pin actuates to allow the tether to assume a direct path between the lower chamber and the actuator.

Yet another embodiment of the present disclosure relates to a method for deploying an airbag in a vehicle upon detecting a vehicle crash event. The airbag includes an upper chamber, a lower chamber, an actuator, an actuatable pin, and a tether. The tether having a predetermined length extends between the lower chamber and the actuator. Further, the actuator and the actuatable pin are disposed along the predetermined length of the tether for maintaining the tether in an indirect path between the actuator and the lower chamber. The method further includes actuating the actuatable pin, thereby creating tension in the tether. Actuation of the actuatable pin positions the lower chamber adjacent to an occupant hip region. In one example, the actuatable pin is a breakable pin and the process of actuating the actuatable pin breaks the pin thereof.

BRIEF DESCRIPTION OF THE DRAWINGS

The above-mentioned embodiments are further described herein with reference to the accompanying figures. It should be noted that the description and figures relate to exemplary embodiments and should not be construed as a limitation to the present disclosure. It is also to be understood that various arrangements may be devised that, although not explicitly described or shown herein, embody the principles of the present disclosure. Moreover, all statements herein reciting principles, aspects, and embodiments of the present disclosure, as well as specific examples, are intended to encompass equivalents thereof.

DETAILED DESCRIPTION

Figure 1:
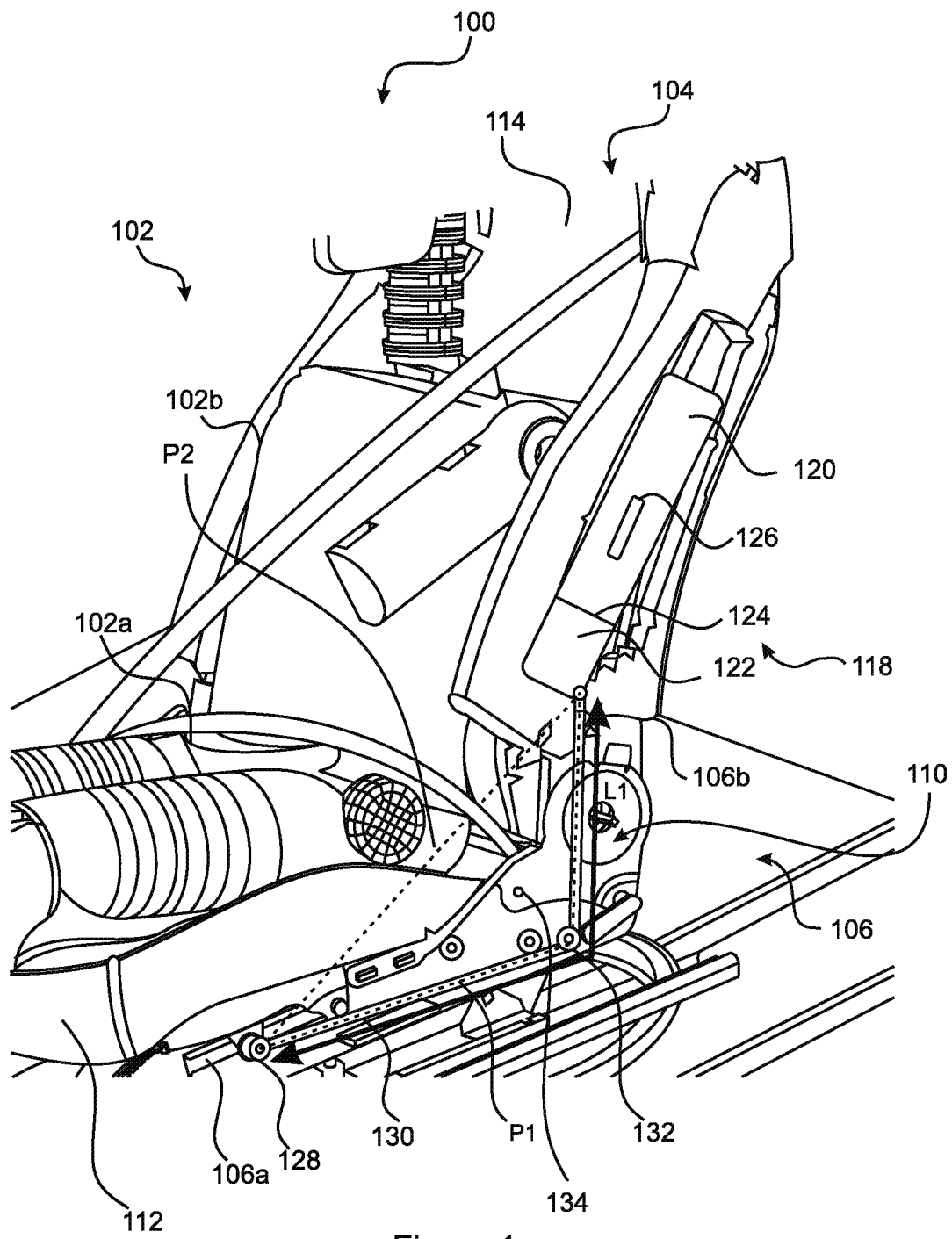
FIG. 1 illustrates a vehicle safety system, in accordance with one embodiment of the present disclosure.

In the following description, certain specific details are set forth in order to provide a thorough understanding of various disclosed embodiments. However, one skilled in the relevant art will recognize that embodiments may be practiced without one or more of these specific details, or with other methods, components, materials, etc.

Unless the context indicates otherwise, throughout the specification and claims which follow, the word "comprise" and variations thereof, such as, "comprises" and "comprising" are to be construed in an open, inclusive sense that is as "including, but not limited to." Further, the terms "first," "second," and similar indicators of the sequence are to be construed as interchangeable unless the context clearly dictates otherwise.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is, as meaning "and/or" unless the content clearly dictates otherwise.

At least one embodiment of the present disclosure provides an airbag system for protecting the lower extremities of an occupant. The airbag system includes an airbag operable to deploy during a vehicle crash event, wherein during the vehicle crash event the airbag is operable to inflate to a predetermined pressure. The airbag includes an upper chamber, a lower chamber, and an actuator. The actuator is disposed at a predetermined lateral distance from the lower chamber. The airbag system further includes a tether extending between the actuator and the lower chamber of the airbag. The tether has a predetermined length. An actuatable pin is disposed along the predetermined length of the tether and maintains the tether in an indirect path between the actuator and the lower chamber. During the vehicle crash event, the actuator is operable to generate a predetermined tension on the tether and the pin actuates to allow the tether to have a direct path between the actuator and the lower chamber.

In one example, the upper chamber and the lower chamber of the airbag system are in fluidic communication. Further, the actuator is a spool actuator, and during the vehicle crash event, the spool actuator is operable to generate the predetermined tension on the tether and receive at least a portion of the tether therein. The tether has a pretension less than the predetermined tension.

In one example, the airbag system further includes an impact sensor operably to deploy the airbag. During the vehicle crash event, the lower chamber is operable to inflate prior to the upper chamber. The airbag system also includes a seat position sensor, wherein the seat position sensor is operable to prevent deployment of the airbag if a seat position is in one or more predetermined positions.

In one example, the actuatable pin is a breakable pin. In another example, the actuatable pin is a retractable pin, the retractable pin is operable to transition from an extended position to a retracted position during the vehicle crash event.

Another embodiment of the present disclosure provides a vehicle safety system for protecting the lower extremities of an occupant. The vehicle safety system includes a seat having a seat back and a seat cushion, and an airbag operable to deploy during a vehicle crash. The seat back of the seat has a substantially vertical orientation and the seat cushion has a substantially horizontal orientation. During the vehicle crash event, the airbag is operable to inflate to a predetermined pressure.

The airbag can include an upper chamber, a lower chamber, and an actuator disposed at a predetermined lateral distance from the lower chamber. The upper chamber is operable to deploy adjacent to an occupant shoulder region, while the lower chamber is operable to deploy adjacent to an occupant hip region. The airbag further includes a tether extending between the actuator and the lower chamber of the airbag, the tether having a predetermined length. An actuatable pin is disposed along the predetermined length of the tether and maintains the tether in an indirect path between the actuator and the lower chamber. During the vehicle crash event, the actuator is operable to generate a predetermined tension on the tether and the pin actuates to allow the tether to have a direct path between the actuator and the lower chamber.

In one example, the airbag is operably disposed within the seat back of the seat. Further, the upper chamber and the lower chamber are in fluidic communication. In one example, the actuator is a spool actuator. During the vehicle crash event, the spool actuator is operable to generate the predetermined tension on the tether and receive at least a portion of the tether therein, thereby positioning the lower chamber adjacent to the occupant hip region. The vehicle safety system further includes an impact sensor operably to deploy the airbag. Furthermore, the seat includes a seat position sensor, wherein the seat position sensor is operable to prevent deploying of the airbag if the seat back and/or the seat cushion are in a predetermined position.

In one example, the actuatable pin is a breakable pin. In another example, the actuatable pin is a retractable pin. The retractable pin is operable to transition from an extended position to a retracted position during the vehicle crash event.

Yet another embodiment of the present disclosure provides a method for protecting the lower extremities of an occupant. The method includes a step of detecting a vehicle crash event. The method further includes a step of deploying an airbag upon detecting the vehicle crash event. The airbag includes an upper chamber and a lower chamber. The lower chamber has a tether with a predetermined length extending between the lower chamber and an actuator. Further, an actuatable pin is disposed along the predetermined length of the tether maintaining the tether in an indirect path between the actuator and the lower chamber. The method further includes a step of actuating the actuatable pin, a step of tensioning, via the actuator, the tether, and a step of positioning, via the tether, the lower chamber adjacent to an occupant hip region.

In one example, the upper chamber and the lower chamber are in fluidic communication. The actuatable pin is a breakable pin and actuating the actuatable pin breaks the breakable pin.

FIG. 1 illustrates a vehicle safety system 100, in accordance with one embodiment of the present disclosure. The vehicle safety system 100 includes a seat 104 and an airbag 118 disposed within the seat 104. In one example, the airbag 118 is disposed within a seat back 114 of the seat 104. It should be noted that the airbag 118 may be disposed at any other suitable position within the seat 104 of the vehicle. In the present disclosure, the airbag 118 is a side airbag configured to protect an occupant 102 during a vehicle crash event. The vehicle may be any automobile such as a car, van, or bus (including an autonomous or semi-autonomous vehicle), using all known methods of powertrain and propulsion systems (i.e., combustion engine, battery-electric, hybrid, etc.).

The seat 104, as shown in FIG. 1, includes a frame 106 that forms a basic structure of the seat 104. The frame 106 further includes a first sub-frame 106a and a second sub-frame 106b. The first sub-frame 106a allows mounting of the seat 104 on a floor of the vehicle. The second sub-frame 106b couples to the first sub-frame 106a via a reclining mechanism 110. It may be understood that the reclining mechanism 110 allows the second sub-frame 106b to pivot with respect to the first sub-frame 106a.

The seat 104 further includes a seat cushion 112 mounted on the first sub-frame 106a such that the seat cushion 112 supports a lower body region 102a of the occupant 102. The seat cushion 112 may also be configured to support and retain the lower body region 102a in the vehicle crash event. In one example, the seat cushion 112 has a substantially horizontal orientation with respect to the floor of the vehicle.

The seat back 114 that may be mounted on the second sub-frame 106b. It should be noted that the seat back 114 may assume one or more predetermined positions that allows the seat back 114 to orient with respect to the seat cushion 112 and/or the floor of the vehicle. To achieve the one or more predetermined positions, the reclining mechanism 110 may be employed that can align the seat back 114 at an angle with respect to the seat cushion 112. In one such predetermined position, the seat back 114 is positioned substantially vertical with respect to the seat cushion 112. While not shown explicitly, the reclining mechanism 110 may include a knob that can be rotated by the occupant 102 to align the seat back 114 with respect to the seat cushion 112 and/or the floor.

According to one embodiment of the present disclosure, the airbag 118 is configured to transition between an undeployed state and a deployed state. While the airbag 118 rests within the seat back 114 in the undeployed state, the airbag 118 in the deployed state may extend laterally outwards with respect to the seat back 114. It should be noted that a new vehicle may come with the airbag 118 packed within the seat back 114, such that the airbag 118 remains in the undeployed state until the vehicle crash event is detected by the vehicle. In one example, the vehicle crash event includes a side crash event and/or a lateral collision.

Once the vehicle crash event is detected, the airbag 118 transitions to the deployed state to protect the occupant 102 from injury. To that end, the vehicle safety system 100 may include one or more sensors (not shown) configured to detect the vehicle crash event that would lead to the deployment of the airbag 118. For instance, the system 100 may include an impact sensor (not shown) configured to detect the vehicle crash event. The impact sensor can be an electrical sensor or a mechanical sensor. The mechanical sensor can be, but not limited to, mass-type sensor and roller-type sensor. In another instance, the electrical sensor can be, but not limited to, accelerometer-based sensor and gyroscope-based sensors.

Once the vehicle crash event is detected, the impact sensor communicates the event to a vehicle computer (not shown) such as an electronic control module (ECM). Eventually, the vehicle computer sends a command to an inflator 126 that is disposed along a lateral side of the seat cushion 112. Upon receiving the command, the inflator 126 may inflate the airbag 118 to transition the airbag 118 into the deployed state, thereby protecting the occupant 102 sitting on the seat 112.

As may be seen in FIG. 1, the airbag 118 includes an upper chamber 120 and a lower chamber 122. The airbag 118 is designed in a manner such that, in the deployed state, the upper chamber 120 protects an upper body region 102b of the occupant 102 and the lower chamber 122 protects the lower body region 102a of the occupant 102. It may be noted that the upper body region 102b may include a neck, shoulder, and/or head region of the occupant 102, while the lower body region 102a includes a pelvic, hip and/or thigh region of the occupant 102.

In one example, the upper chamber 120 may size substantially larger as compared to the lower chamber 122. This enables the two chambers 120 and 122 to provide effective protection to the corresponding upper and lower regions 102b and 102a of the occupant 102, respectively, during the vehicle crash event. To that end, the two chambers 120 and 122 may be made from a suitable material that imparts substantial stiffness, while maintaining the flexibility. This enables immediate deployment and accurate positioning of the two chambers 120 and 122 during the vehicle crash event. It may be understood that the size, shape and/or stiffness of the two chambers 120 and 122 may vary or remain the same for specific vehicles.

In one example, the upper chamber 120 and the lower chamber 122 may be manufactured as a single unit. In the other example, the upper chamber 120 and the lower chamber 122 may be manufactured as separate units and joined using one or more suitable techniques, such as sewing, stitching, taping, heat sealing, and the like.

Further, the upper chamber 120 and the lower chamber 122 may have a baffle 124 positioned therebetween. The baffle 124 allows a fluidic communication between the two chambers 120 and 122.

The inflator 126 supplies an inflation fluid (not shown) to the two chambers 120 and 122 to transition the airbag 118 to the deployed state. As may be understood the inflator 126 supplies a chemical that creates a large volume of gas at a high pressure to inflate the upper chamber 120 and the lower chamber 122. The chemical, in one example, can be a propellant housed within a casing of the inflator 126. In at least one instance, the propellant can be Potassium Nitrate and/or mixture thereof. The present disclosure includes a single inflator 126 to inflate the two chambers 120 and 122, however, it may be noted that two separate inflators (not shown) may be employed to separately inflate the two chambers 120 and 122. In addition, the inflator 126 may supply the inflation fluid (not shown) to the two chambers 120 and 122 simultaneously, such that the two chambers 120 and 122 are inflated in parallel.

The airbag 118 further includes an actuator 128 disposed in the second sub-frame 106b beneath the seat cushion 112 of the vehicle. The actuator 128 may be disposed at a predetermined lateral distance from the lower chamber 122. The lateral distance may be the distance between the actuator 128 and the lower chamber 122 along a side of the seat 104.

Further, the actuator 128 is operably coupled to the lower chamber 122 by a tether 130. In other words, the tether 130 extends between the actuator 128 and the lower chamber 122. The actuator 128, in operation, exerts a pulling force on the lower chamber 122 via the tether 130 to position the lower chamber 122 adjacent to the occupant's lower body region 102a in the deployed state.

The actuator 128 can be of different types based on their design. For instance, the actuator 128 can be a pyro-technic linear actuator that can generate tension to pull the tether 130 towards the actuator 128 as shown in FIG. 1. In another instance, the actuator 128 can be a rotary spool actuator that can spin at high speeds to spool the tether 130 therearound (as detailed in FIG. 2).

According to the present disclosure, the tether 130 has a predetermined length L1. In one example, the predetermined length L1 remains constant while the tether 130 extends between the lower chamber 122 and the actuator 128. Further, the tether 130 can assume two different paths namely, an indirect path P1 and a direct path P2. The indirect path P1 is a path that the tether 130 assumes when the airbag 118 is in the undeployed state. The tether 130 assumes the direct path P2 when the airbag 118 is in the deployed state.

According to one embodiment, the tether 130 is made up of an elastic material. The elasticity may allow the tether 130 to transition between the direct path P2 and the indirect path P1. For instance, a first tension may be applied to the tether 130 to maintain the tether 130 in the indirect path P1, such that applying a second tension greater than the first tension may allow the tether 130 to assume the direct path P2.

According to one embodiment of the present disclosure, the actuator 128 may be employed to control the tether 130 to assume the indirect path P1 and the direct path P2. For instance, the tether 130 may have a pretension that imparts tautness in the tether 130, thereby maintaining the tether 130 in the indirect path P1. In another instance, the actuator 128 may apply another tension having a magnitude greater than the magnitude of the pretension, thereby allowing the tether 130 to assume the direct path P2. For example, the actuator 128 applies a predetermined tension greater than the pretension to the tether 130 that causes a portion of the tether 130 to move towards the actuator 128. As a result, the actuator 128 receives a portion of the tether 130 that can be spooled by the actuator 128.

The airbag system 118 further includes an actuatable pin 132 disposed along the predetermined length L1 of the tether 130. The actuatable pin 132 is configured to maintain the tether 130 in the indirect path P1 in the undeployed state of the airbag 118. Moreover, the actuatable pin 132 is configured to hold the tether 130 in a manner that the tension applied to the tether 130 by the actuator 128 is also experienced by the actuatable pin 132. The actuatable pin 132 is configured to release the tether 130 to allow the tether 130 to assume the direct path P2, upon application of the predetermined tension on the tether 130.

In one example, the actuatable pin 132 is a breakable pin that can be broken by applying the predetermined tension that allows the tether 130 to assume the direct path P2. To accomplish this, the actuatable pin 132 may have a yield strength less to the second predetermined tension applied to the tether 130 but greater than the predetermined pretension. Accordingly, when the actuator 128 applies the predetermined tension to the tether 130, the tether 130 applies the same predetermined tension to the actuatable pin 132 causing the actuatable pin 132 to break. The breaking of the actuatable pin 132 releases the tether 130 to assume the direct path P2.

In another example, the actuatable pin 132 is a retractable pin that can transition between an extended position and a retracted position. In the extended position, the actuatable pin 132 may hold the tether 130 and allow the tether 130 to assume the indirect path P1. While in the retracted position, the actuatable pin 132 may be retracted within a portion of the seat 104 that allows the tether 130 to assume the direct path P2. It may be noted that the actuatable pin 132 is configured to move from the extended position to the retracted position when the predetermined tension is applied to the tether 130. This allows the airbag 118 to transition to the deployed state.

While the airbag 118 in the shown embodiment is disposed within a single seat 104 of the vehicle, it should be noted that the airbag 118 may be disposed in one or more of the other seats of the vehicle to protect one or more occupants sitting thereon, respectively. For example, the vehicle may have two airbags each disposed within the two front seats of the vehicle. In another example, a four-seater vehicle may have four airbags disposed within the four seats respectively, thereby protecting the occupants sitting thereon from any injury during the vehicle crash event.

The vehicle safety system 100 may further include a seat position sensor 134 that is operable to prevent deployment of the airbag 118 and/or actuation of the actuatable pin 132, if the seat position sensor 134 senses that the seat 104 is in one or more predetermined positions. For instance, the seat position sensor 134 is configured to measure an angle of inclination of the second sub-frame 106b with respect to the first sub-frame 106a and determine whether to deploy the airbag 118. In other words, the seat position sensor 134 determines a reclining angle of the seat back 114 with respect to the seat cushion 112. For example, in a stowed seat position where the second sub-frame 106b rests along the first sub-frame 106a, the seat sensor 134 may sense that no occupant is seated on the seat 104 and thus prevents the deployment of the airbag 118 and/or actuation of the actuatable pin 132 during the vehicle crash event.

Although not shown, the vehicle safety system 100 includes an airbag control unit (ACU) that is configured to control the deployment of the airbag 118. In one example, the ACU can include a processor that can be a digital signal processor (e.g., a microprocessor, a microcontroller, or a fixed-logic processor, etc.) configured to execute instructions or logic. The processor may include a general-purpose processor, special-purpose processor (where software instructions are incorporated into the processor), a state machine, application-specific integrated circuit (ASIC), a programmable gate array (PGA) including a field PGA, an individual component, a distributed group of processors, and the like.

According to the present disclosure, the ACU is coupled with the impact sensor to detect the vehicle crash event to determine whether to deploy the airbag 118 or not. In addition, the ACU is coupled to the seat position sensor 134 to detect the angle of inclination to determine whether to actuate the actuator 128 to apply the predetermined tension to the tether 130.

Figure 2:
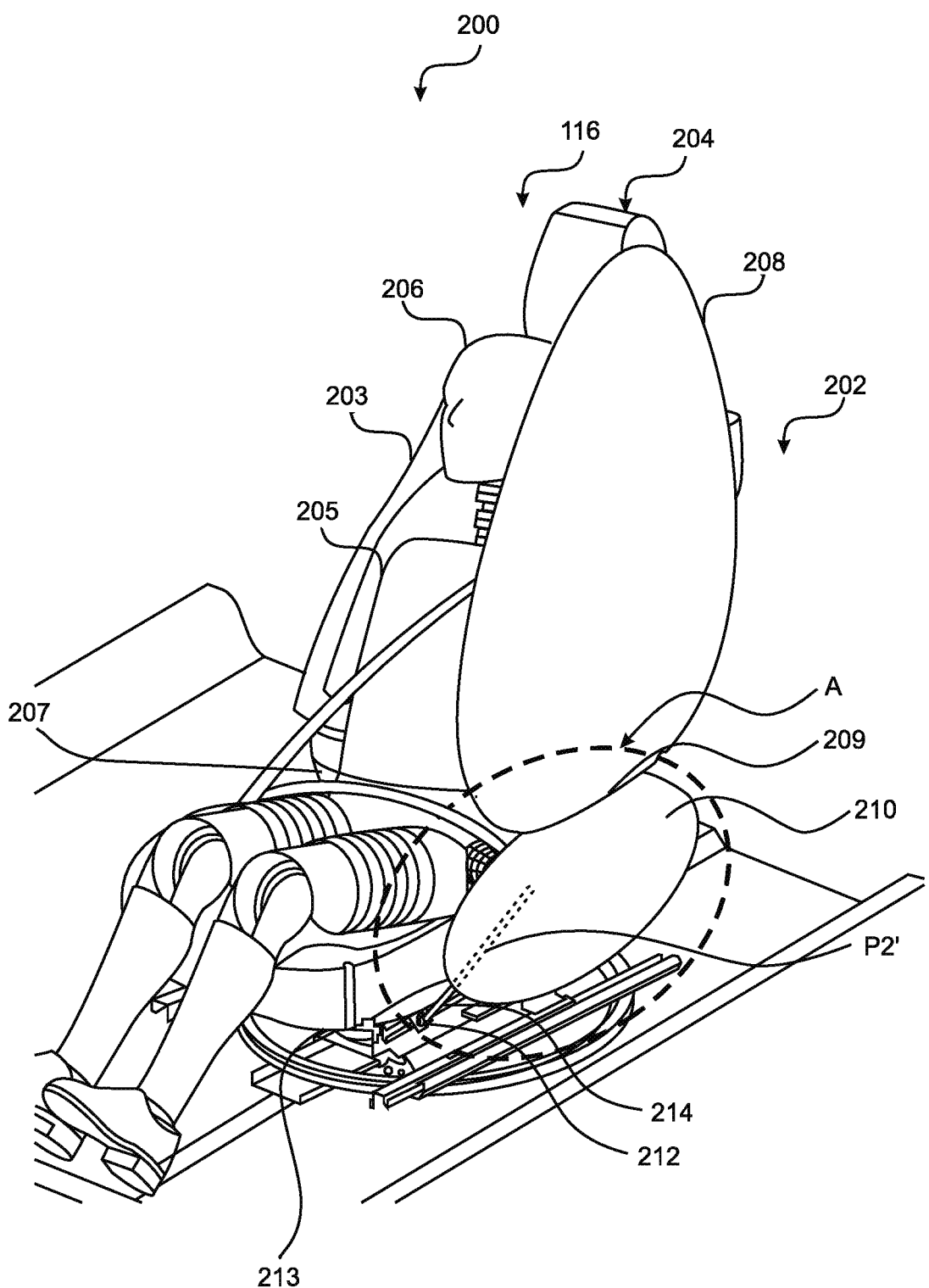
FIG. 2 illustrates an airbag system, in accordance with one embodiment of the present disclosure.

FIG. 2 illustrates an airbag system 200 having an airbag 202, in accordance with an embodiment of the present disclosure. The airbag 202 may be disposed within a seat 204 of a vehicle (not shown). In one example, the airbag 202 is disposed within a seat back 203 of the seat 204. The airbag 202 is further configured to transition between a deployed state and an undeployed state. In the undeployed state, the airbag 202 rests within the seat 204. FIG. 2 illustrates the airbag 202 in the deployed state, where the airbag 202 extends laterally outwards with respect to the seat 204. In other words, the airbag 202 inflates to provide cushioning to an occupant 206 seated on the seat 204 in the deployed state. While not shown explicitly, the airbag 202 may receive a signal from a vehicle computer to transition to the deployed state, upon detection of a vehicle crash event. In one example, the vehicle crash event may include a side impact event and/or a lateral collision.

As shown, the airbag 202 includes an upper chamber 208 and a lower chamber 210, where the upper chamber 208 is configured to protect an upper body region 205 of the occupant 206 and the lower chamber 210 protects a lower body region 207 of the occupant 206. In one example, the two chambers 208 and 210 may attain a substantially spheroidal shape upon deployment during the vehicle crash event. However, it should be noted that the two chambers 208 and 210 may take any configuration suitable to protect the occupant 206 during the vehicle crash event.

In one example, to provide effective protection, the configuration of the two chambers 208 and 210 may conform to a side profile of the occupant 206. As may be understood the upper and lower body regions 205 and 207 of the occupant 206 may vary in size. Therefore, the size of the two chambers 208 and 210 may vary accordingly to provide adequate protection to the occupant 206. For instance, the upper chamber 208 is designed in such a way that the upper chamber 208 covers a complete length of the seat back 203, thereby providing complete protection to the upper body region 205 of the occupant 206. Similarly, the lower chamber 210 is designed in such a way that the lower chamber 210 covers a complete length of the seat cushion (similar to the seat cushion 112 shown in FIG. 1), thereby providing complete protection to the lower body region 207 of the occupant 206. Eventually, the upper chamber 208 and the lower chamber 210 in combination provide complete protection to the occupant 206 in the deployed state.

The airbag 202 further includes a baffle 209 disposed between the upper chamber 208 and the lower chamber 210, such that the two chambers 208 and 210 may remain in fluidic communication via the baffle 209. It should be noted that the baffle 209 may work in a manner similar to the baffle 124 shown in FIG. 1.

The airbag 202 may further include one or more inflators (not shown) configured to supply an inflation fluid to the two chambers 208 and 210. The inflation fluid may pass through the baffle 209 to the two chambers 208 and 210, thereby inflating the two chambers 208 and 210. This transits the airbag 202 to the deployed state. In one example, the two chambers 208 and 210 may inflate in-parallel. However, in another example, the lower chamber 210 may inflate prior to the upper chamber 208. The prior inflation of lower chamber 210 provides adequate protection to the lower body region 207 of the occupant 206, which was compromised in the conventional side airbag designs. It may be understood that the inflator and/or the inflation fluid may be one or more devices and/or fluids known in the art.

In addition to the two chambers 208 and 210 and the components used to inflate the two chambers 208 and 210, the airbag 202 includes an actuator 212, a tether 214, and an actuatable pin (not shown). In the illustrated embodiment, the actuator 212 along with the tether 214 and the actuatable pin may be operated to transition the airbag 202 to the deployed state. The subsequent section provides more details pertaining to the actuator 212, the tether 214, and the actuatable pin along with the operations implemented by one or more of these components to transition the airbag 202 to the deployed state (as shown in FIG. 2).

The actuator 212 may be disposed within the seat cushion of the vehicle. In one example, the actuator 212 is disposed at a predetermined lateral distance from the lower chamber 210 such that the actuator 212 is transverse to the airbag 202 in the undeployed state.

Further, the tether 214 may extend between the actuator 212 and the lower chamber 210, thereby coupling the actuator 212 to the lower chamber 210. The tether 214 may transition to assume an indirect path (not shown) and a direct path P2'. It may be understood that the tether 214 may assume the indirect path in the undeployed state of the airbag 202 (similar to P1 of FIG. 1). The tether 214 assumes the direct path P2' in the deployed state of the airbag 202 (as shown in FIG. 2).

In one example, the tether 214 has a predetermined length and may be made from a suitable elastic material. The elasticity of the tether 214 may allow transition of the tether 214 between the indirect path and the direct path P2'. Therefore, a predetermined tension may be exerted on the tether 214 that allows the tether 214 to assume the direct path P2' in the deployed state.

In one example, the predetermined tension may be exerted on the tether 214 using the actuatable pin. The actuatable pin may be disposed along the predetermined length of the tether 214. In one example, the actuatable pin may position closer to a reclining mechanism (similar to the reclining mechanism 110 of FIG. 1) of the seat 204, such that the actuatable pin is transverse to the airbag 202 in the undeployed state. The actuatable pin is configured to hold the tether 214 in such a way that the tension applied to the tether 214 may also be experienced by the actuatable pin. The actuatable pin is configured to maintain the tether 214 in the indirect path (P1, as shown in FIG. 1) during the undeployed state of the airbag 202.

Upon detection of the vehicle crash event, the actuator 212 operates to generate a predetermined tension on the tether 214. The tension exerted on the tether 214 would impart a corresponding tension on the actuatable pin. As a result, the actuatable pin is actuated to release the tether 214 to allow the tether 214 to assume the direct path P2' (as shown in FIG. 2).

In one example, the actuatable pin is a breakable pin that can be broken by applying the tension that allows the tether 214 to assume the direct path P2'. For instance, the actuatable pin has a yield strength equal to the predetermined tension applied to the tether 214. Accordingly, when the actuator 212 applies the predetermined tension to the tether 214, the tether 214 applies the same predetermined tension to the actuatable pin. This causes the actuatable pin to break, thereby releasing the tether 214 to assume the direct path P2'.

In another example, the actuatable pin is a retractable pin that is operable between an extended position and a retracted position. In the extended position, the actuatable pin is deployed to hold the tether 214 in the indirect path (P1 as shown in FIG. 1). In the retracted position, the actuatable pin retracts into a portion of the seat 204 allowing the tether 214 to assume the direct path P2' (as shown in FIG. 2). Further, the actuatable pin is configured to move from the extended position to the retracted position when the airbag 202 is deployed.

It may be understood that the actuator 212 can be a pyro-technic linear actuator that can generate tension to pull the tether 214 towards the actuator 212 (as shown in FIG. 1). In another example, the actuator 212 can be a rotary spool actuator that can spin at high speeds to spool the tether 214 around the actuator 212. More details pertaining to the rotary spool actuator, as shown as section A, are discussed with respect to FIG. 3.

Those skilled in the art will appreciate that the airbag 202 shown in FIG. 2 may have one or more components similar to the components of the airbag 118 shown in FIG. 1. To that end, the deployed state of the airbag 118 (as shown in FIG. 1) may look similar to the deployed state of the airbag 202, as shown in FIG. 2.

Figure 3:
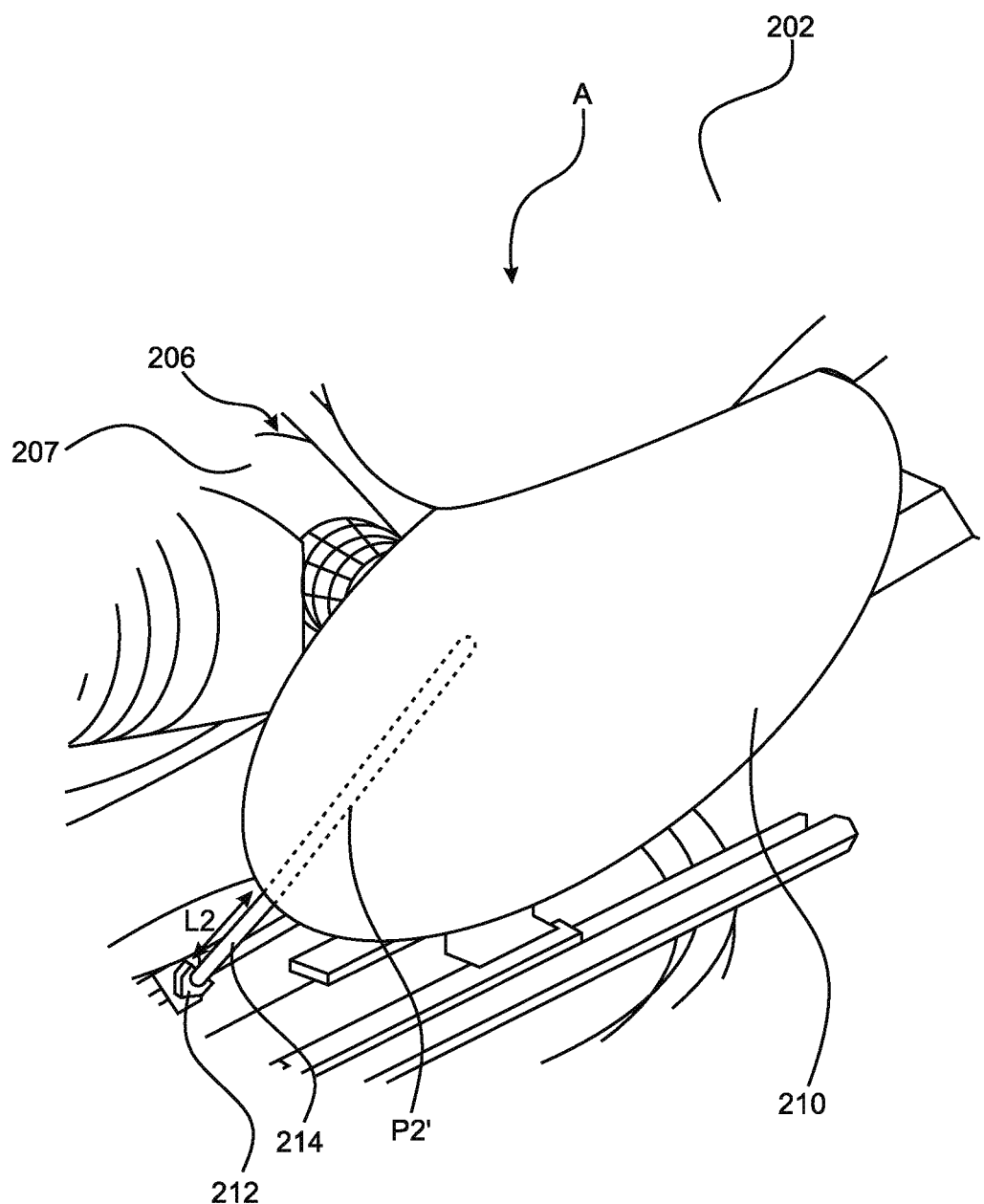
FIG. 3 shows an enlarged view of a section of the airbag system of FIG. 2, in accordance with one embodiment of the present disclosure.

FIG. 3 shows an enlarged view 300 of the section A of the airbag 202 in the deployed state, in accordance with one embodiment of the present disclosure. In the illustrated view, the tether 214 is pulled by the actuator 212, thereby pulling the lower chamber 210 closer to the lower body region 207 of the occupant 206. As shown, the tether 214 assumes the direct path P2'.

In the deployed state, the actuator 212 receives a portion of the tether 214 while pulling the tether 214 during deployment of the lower chamber 210. As a result, an unwound length L2 of the tether 214 remains between the lower chamber 210 and the actuator 212. Moreover, the tether 214 remains tensed to keep the lower chamber 210 adjacent to the lower body region 207, while the lower chamber 210 remains inflated during the deployed state. Further, the tether 214 may be loosened by the actuator 214 after the airbag 202 has deflated. The deflation of airbag 202 may allow the occupant 206 to come out of the seat and/or vehicle.

Figure 4A:
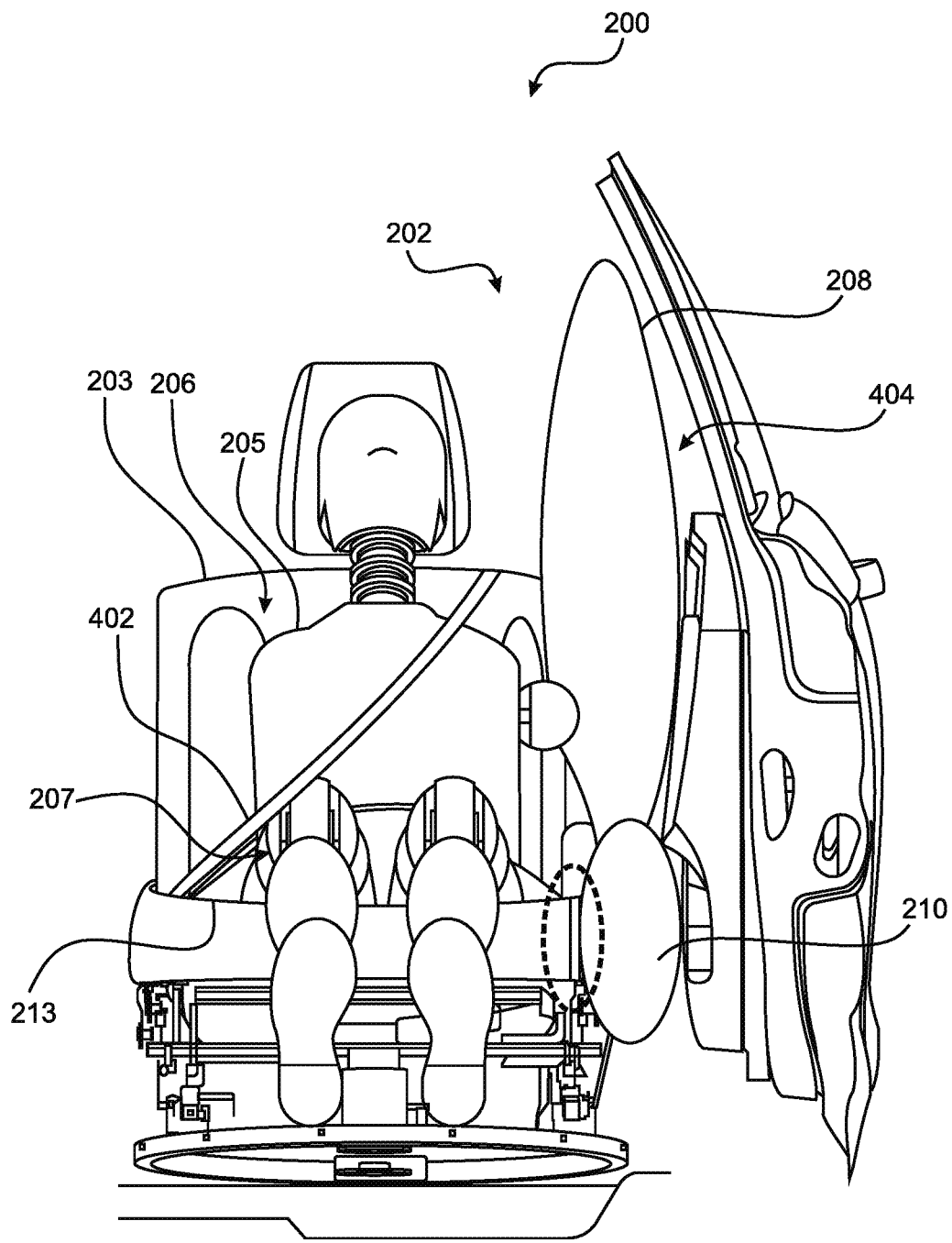
FIG. 4a illustrates a front perspective view of an airbag system, in accordance with one embodiment of the present disclosure.
Figure 4B:
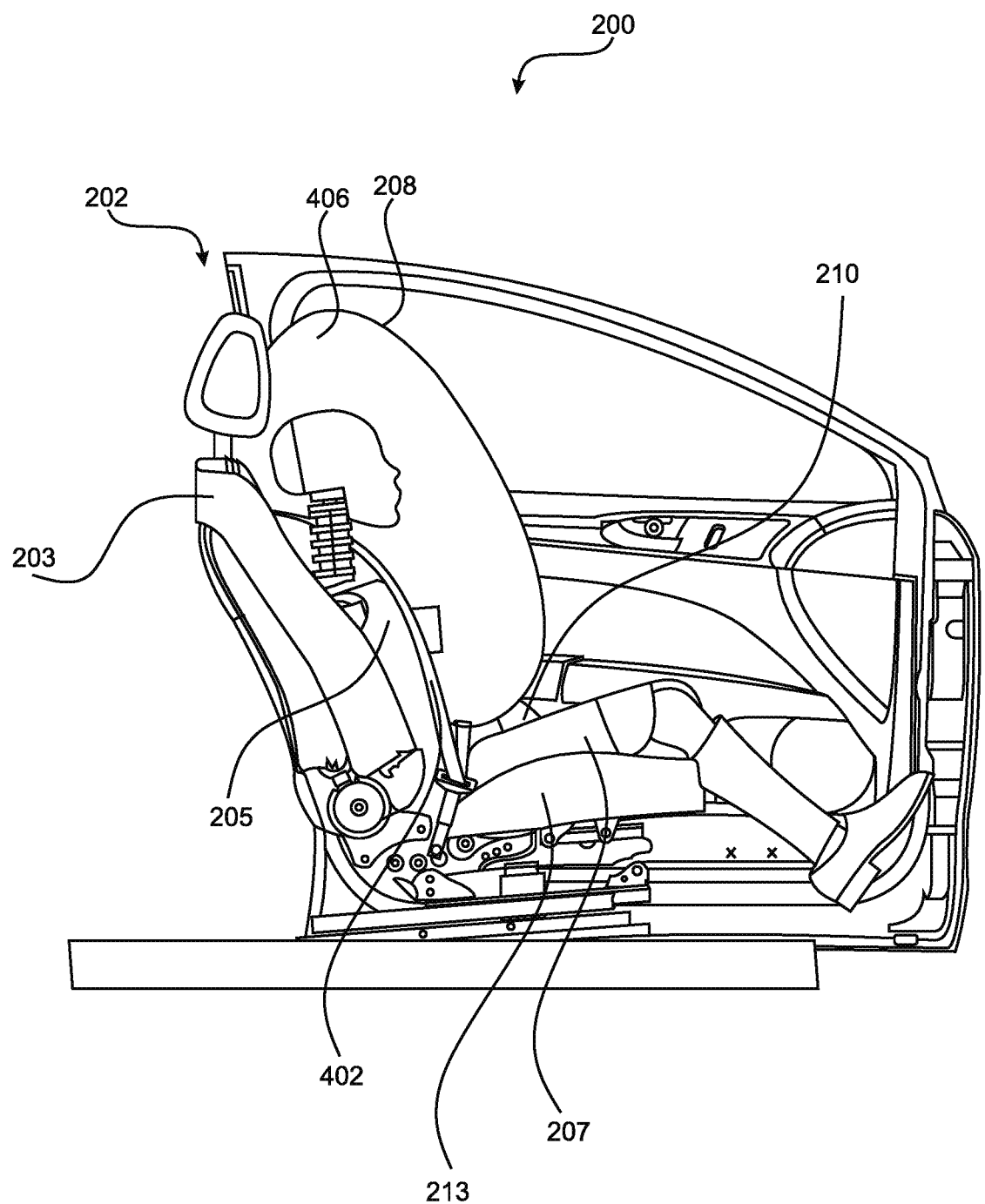
FIG. 4b illustrates a side perspective view of an airbag system, in accordance with one embodiment of the present disclosure.
Figure 4C:
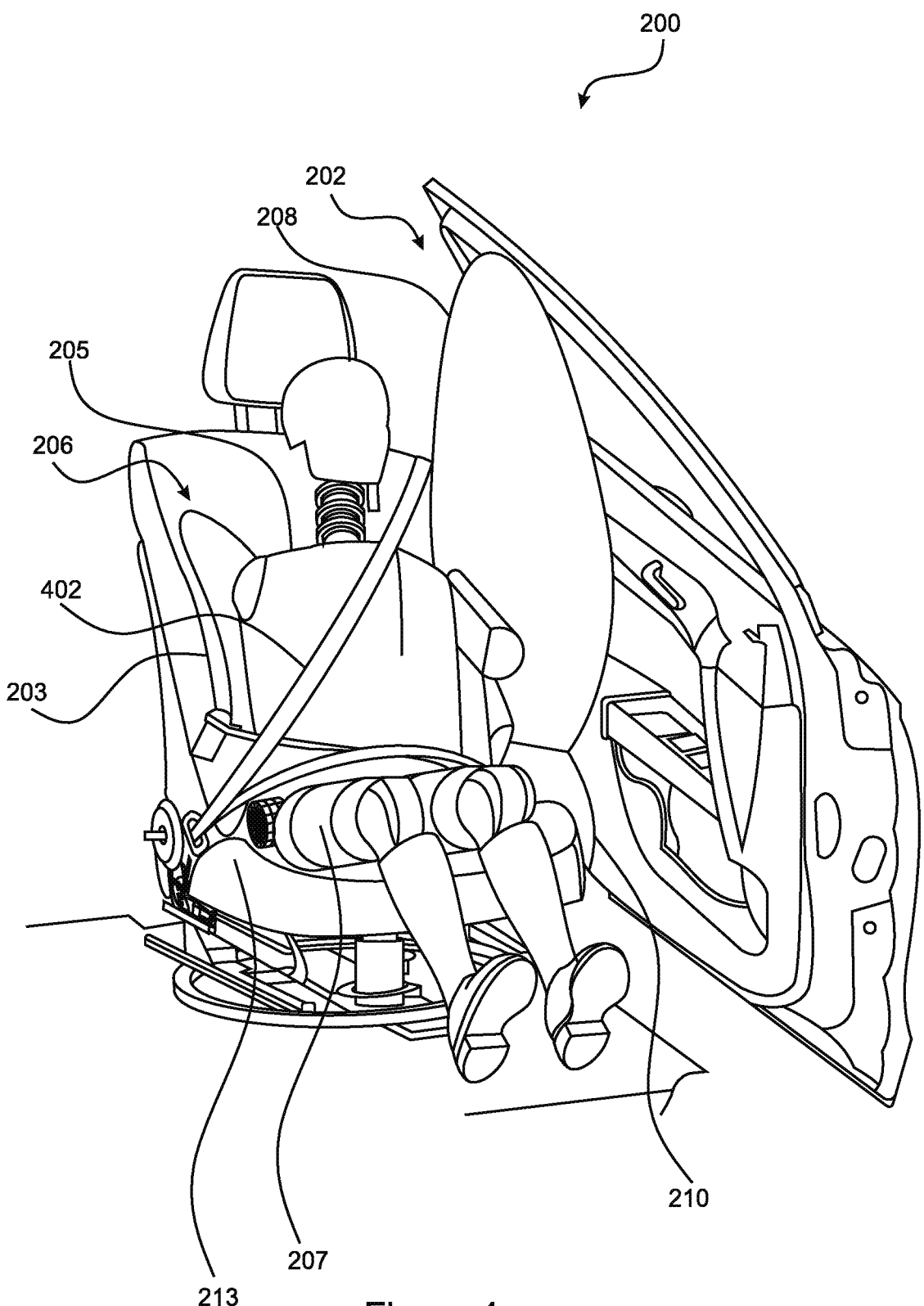
FIG. 4c illustrates a front isometric view of an airbag system, in accordance with one embodiment of the present disclosure.

FIGS. 4a-4c illustrate various views of the airbag system 200, with the airbag 202 in the deployed state, in accordance with one embodiment of the present disclosure. The airbag 202 works in conjunction with a seat belt 402 of the vehicle to protect the occupant 206. For instance, the seat belt 402 may secure the occupant 206 and prevent excessive movement of the occupant 206 during the vehicle crash event. Further, during the vehicle crash event, a first side 404 of the airbag 202 may contact a vehicle door to avoid injury from a movement of the door towards the occupant 206 during the vehicle crash event. Further, a second side 406 of the airbag 202 provides cushioning to the occupant 206 so that the occupant 206 is protected from the impact.

As shown, the seat back 203 is reclined with respect to the seat cushion 213. This allows the upper chamber 208 to provide substantial coverage to the upper body region 205 of the occupant 206. Accordingly, the lower chamber 210 is pulled towards the lower body region 207. The lower chamber 210 can protect the lower body region 207 including the hip, thigh, and/or pelvic region of the occupant 206 during the vehicle crash event.

Figure 5:
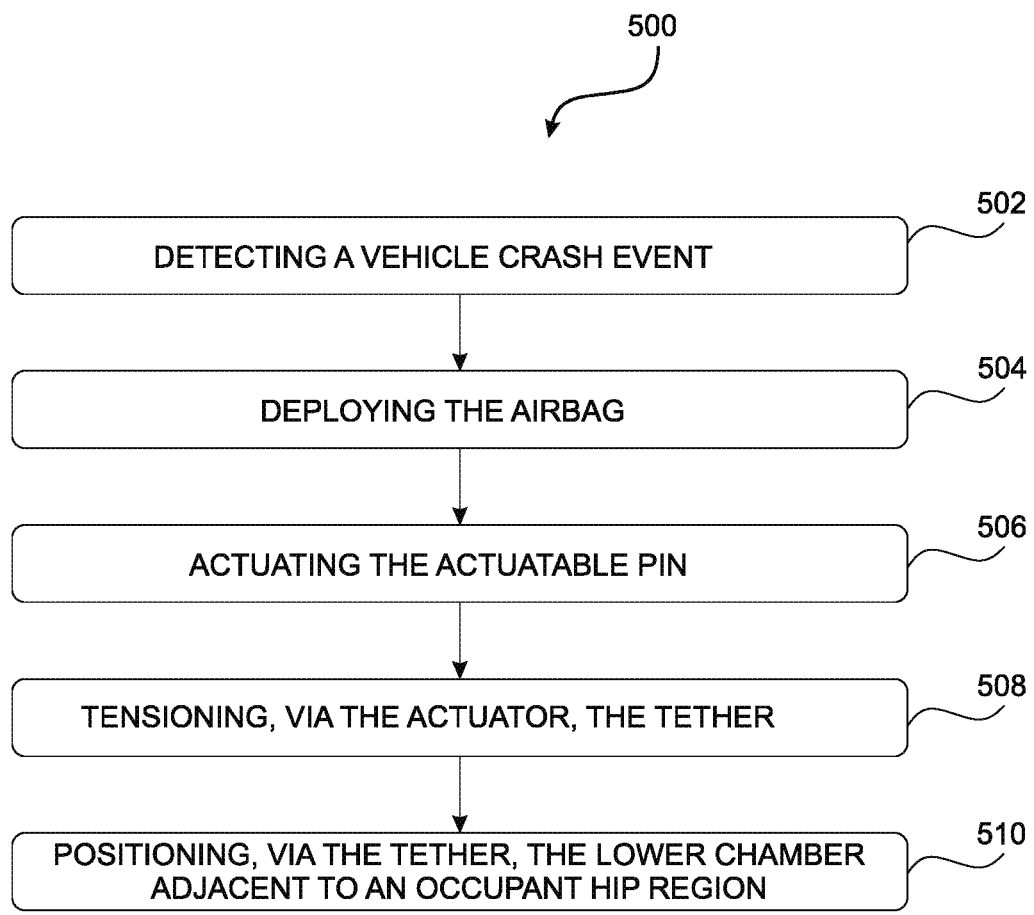
FIG. 5 illustrates a method of deploying the airbag, in accordance with one embodiment of the present disclosure.

FIG. 5 illustrates a method 500 of operating the airbag system 200 of FIGS. 2-4, in accordance with one embodiment of the present disclosure. The method 500 may also be implemented by the vehicle safety system 100 of FIG. 1. The method 500 described below may be carried out using the configurations illustrated in FIGS. 1 through 4c, for example, and various elements of these figures are referenced in explaining the example method 500. Each step shown in FIG. 5 represents one or more processes, methods or subroutines, carried out in the example method 500. Furthermore, the illustrated order of steps is illustrative only and the order of the steps may change according to the present disclosure. Additional steps may be added or fewer steps may be utilized, without departing from the scope of the present disclosure. The example method 500 begins at step 502.

The method, at step 502, detects the occurrence of a vehicle crash event. For instance, the impact sensor mounted on a vehicle chassis or a vehicle door may sense a side impact to the vehicle. Moreover, the impact sensor senses a magnitude of the side impact and sends a signal to the ACU in case the magnitude of the side impact exceeds a predetermined threshold.

At step 504, the airbag is deployed. As a part of the airbag deployment, the ACU determines an angle of inclination of the seat back with respect to the seat cushion. To this end, the ACU receives a signal from the seat position sensor. Further, the ACU checks if the angle of inclination satisfies a predetermined angle. For instance, in case the seat back is aligned substantially vertical with respect to the seat base, the ACU allows the deployment of the airbag. However, if the angle of inclination is less than the predetermined angle, the ACU may not allow the deployment of the airbag. One such example is when the seat back rests along the seat base in a stowed position. In such a position, the deployment of the airbag is not required considering no occupant is sitting thereon.

If the ACU allows the deployment of the airbag, the ACU triggers the inflator to inflate the lower chamber prior to the upper chamber. As the lower chamber starts inflating, the inflator triggers inflation of the upper chamber. The two chambers may fully inflate at almost the same period to provide adequate protection to the upper and lower body regions of the occupant.

At step 506, the actuatable pin is actuated to allow the tether to assume the direct path. To accomplish the actuation of the actuatable pin, the ACU sends an actuation signal to the release mechanism of the actuatable pin so that the actuatable pin moves from the extended position to the retracted position. On the other hand, in case the actuatable pin is a breakable pin, the ACU actuates the actuator to increases the tension in the tether beyond the yield strength of the actuatable pin. As a result, the actuatable pin snaps to allow the tether to assume the direct path.

At step 508, the actuator applies a tension on the tether that is more than the predetermined tension applied on the tether by the actuatable pin. As a result, a portion of the tether starts moving towards the actuator. Further, in case the actuator is a rotary spool actuator, the portion of the tether starts to wound around the actuator.

Finally, at step 510, the winding tether positions the lower chamber adjacent to the occupant lower region or the occupant hip region. Simultaneously, the upper chamber inflates adjacent to the occupant upper region to protect the occupant upper region. Once the occupant is protected from the side impact, the upper chamber and the lower chamber may deflate to create space for the occupant to exit the vehicle.

The order in which the method is described is not intended to be construed as a limitation, and any number of the described method blocks can be combined in any order to implement the method or an alternative method. Additionally, individual blocks may be deleted from the method without departing from the spirit and scope of the methods, systems, and devices described herein. Furthermore, the method can be implemented in any suitable hardware, software, firmware, or combination thereof.

Although the present disclosure has been described with reference to specific embodiments, this description is not meant to be construed in a limiting sense. Various modifications of the disclosed embodiments, as well as alternate embodiments of the present disclosure, will become apparent to persons skilled in the art upon reference to the description of the present disclosure. It is therefore contemplated that such modifications can be made without departing from the spirit or scope of the present disclosure as defined.

What is claimed is:

1. An airbag system for protecting the lower extremities of an occupant, comprising:
    an airbag operable to deploy during a vehicle crash event, wherein during the vehicle crash event the airbag is operable to inflate to a predetermined pressure, the airbag comprising:
        an upper chamber; and
        a lower chamber;
    an actuator disposed at a predetermined lateral distance from the lower chamber;
    a tether extending between the actuator and the lower chamber of the airbag, the tether having a predetermined length;
    an actuatable pin disposed along the predetermined length of the tether, and maintaining the tether in an indirect path between the actuator and the lower chamber,
    wherein during the vehicle crash event the actuator is operable to generate a predetermined tension on the tether, the pin actuates to allow the tether to have a direct path between the actuator and the lower chamber.

2. The airbag system of claim 1, wherein the upper chamber and the lower chamber are in fluidic communication.

3. The airbag system of claim 1, wherein the actuator is a spool actuator, and during the vehicle crash event, the spool actuator is operable to generate the predetermined tension on the tether and receive at least a portion of the tether therein.

4. The airbag system of claim 1, wherein the tether has a pretension less than the predetermined tension.

5. The airbag system of claim 1, further comprising an impact sensor operably to deploy the airbag.

6. The airbag system of claim 1, wherein during the vehicle crash event the lower chamber is operable to inflate prior to the upper chamber.

7. The airbag system of claim 1, further comprising a seat position sensor, wherein the seat position sensor is operable to prevent deployment of the airbag if a seat position is in one or more predetermined positions.

8. The airbag system of claim 1, wherein the actuatable pin is a breakable pin.

9. The airbag system of claim 1, wherein the actuatable pin is a retractable pin, the retractable pin operable to transition from an extended position to a retracted position during the vehicle crash event.

10. A vehicle safety system for protecting the lower extremities of an occupant, comprising:
    a seat having a seat back and a seat cushion, wherein the seat back is substantially vertical orientation and the seat cushion is a substantially horizontal orientation;
    an airbag operable to deploy during a vehicle crash event, wherein during the vehicle crash event the airbag is operable to inflate to a predetermined pressure, the airbag comprising:
        an upper chamber, wherein the upper chamber is operable to deploy adjacent to an occupant shoulder region; and
        a lower chamber, wherein the lower chamber is operable to deploy adjacent to an occupant hip region;
    an actuator disposed at a predetermined lateral distance from the lower chamber;
    a tether extending between the actuator and the lower chamber of the airbag, the tether having a predetermined length;
    an actuatable pin disposed along the predetermined length of the tether, and maintaining the tether in an indirect path between the actuator and the lower chamber,
    wherein during the vehicle crash event the actuator is operable to generate a predetermined tension on the tether, the pin actuates to allow the tether to have a direct path between the actuator and the lower chamber.

11. The vehicle safety system of claim 10, wherein the airbag is operably disposed within the seat back of the seat.

12. The vehicle safety system of claim 10, wherein the upper chamber and the lower chamber are in fluidic communication.

13. The vehicle safety system of claim 10, wherein the actuator is a spool actuator, and during the vehicle crash event, the spool actuator is operable to generate the predetermined tension on the tether and receive at least a portion of the tether therein, thereby positioning the lower chamber adjacent to the occupant hip region.

14. The vehicle safety system of claim 10, further comprising an impact sensor operably to deploy the airbag.

15. The vehicle safety system of claim 10, wherein the seat includes a seat position sensor, wherein the seat position sensor is operable to prevent deploying of the airbag if the seat back and/or the seat cushion is in a predetermined position.

16. The vehicle safety system of claim 10, wherein the actuatable pin is a breakable pin.

17. The vehicle safety system of claim 10, wherein the actuatable pin is a retractable pin, the retractable pin operable to transition from an extended position to a retracted position during the vehicle crash event.

18. A method for protecting the lower extremities of an occupant, the method comprising:
    detecting a vehicle crash event;
    deploying an airbag, wherein the airbag includes an upper chamber and a lower chamber, the lower chamber having a tether with a predetermined length extending between the lower chamber and an actuator and an actuatable pin disposed along the predetermined length of the tether maintaining the tether in an indirect path between the actuator and the lower chamber;
    actuating the actuatable pin;
    tensioning, via the actuator, the tether; and
    positioning, via the tether, the lower chamber adjacent to an occupant hip region.

19. The method of claim 18, wherein the upper chamber and the lower chamber are in fluidic communication.

20. The method of claim 18, wherein the actuatable pin is a breakable pin, and actuating the actuatable pin breaks the breakable pin.

* * * * *